(12) United States Patent
Nocon

(10) Patent No.: US 10,761,180 B1
(45) Date of Patent: Sep. 1, 2020

(54) SYSTEM AND METHOD FOR DETERMINING ACTIVATION SEQUENCES OF DEVICES

(71) Applicant: Disney Enterprises, Inc., Burbank, CA (US)

(72) Inventor: Nathan D. Nocon, Valencia, CA (US)

(73) Assignee: Disney Enterprises Inc., Burbank, CA (US)

( * ) Notice: Subject to any disclaimer, the term of this patent is extended or adjusted under 35 U.S.C. 154(b) by 0 days.

(21) Appl. No.: 16/586,409

(22) Filed: Sep. 27, 2019

(51) Int. Cl.
*H04W 4/02* (2018.01)
*G01S 5/02* (2010.01)
*H04N 21/482* (2011.01)
*H04W 4/80* (2018.01)
*H04W 56/00* (2009.01)

(52) U.S. Cl.
CPC ....... *G01S 5/0268* (2013.01); *H04N 21/4825* (2013.01); *H04W 4/023* (2013.01); *H04W 4/80* (2018.02); *H04W 56/001* (2013.01)

(58) Field of Classification Search
CPC .................................................... H04W 4/80
See application file for complete search history.

(56) References Cited

U.S. PATENT DOCUMENTS

| 9,987,558 | B2 | 6/2018 | Schlossberg | |
| 10,004,984 | B2 | 6/2018 | Voris | |
| 10,330,783 | B1 * | 6/2019 | Yuan | G01S 11/06 |
| 2013/0024018 | A1 | 1/2013 | Chang | |
| 2016/0198285 | A1 * | 7/2016 | Lin | H04W 4/38 709/209 |
| 2019/0173594 | A1 | 6/2019 | Davaadorj | |

FOREIGN PATENT DOCUMENTS

| BR | 102014008492 | 1/2016 |
| WO | WO2018112632 | 6/2018 |

OTHER PUBLICATIONS

Alletto, Stefano, et al. "An Indoor Location-aware System for an IoTbased Smart Museum," *IEEE Internet of Things Journal*, vol. 3, Issue 2, Apr. 2016. pp. 1-10.

Kaitala, Kalle. "How to do Accurate Indoor Positioning with Bluetooth Beacons?," Proximi.io, Jul. 28, 2017. pp. 1-10.

* cited by examiner

*Primary Examiner* — Michael T Vu
(74) *Attorney, Agent, or Firm* — Farjami & Farjami LLP

(57) ABSTRACT

A system includes a host device having a hardware processor and a host wireless transceiver, and client devices having client wireless transceivers for wireless communications with the host device. The hardware processor receives wireless signals transmitted by the client wireless transceivers using the host wireless transceiver, and determines locations of the client devices relative to the host device based on angles of arrival of the of the wireless signals. The hardware processor further determines an activation sequence for activating the client devices based on the locations relative to the host device, and transmits control signals using the host wireless transceiver, according to the activation sequence, to activate the client devices.

20 Claims, 6 Drawing Sheets

SYSTEM AND METHOD FOR DETERMINING ACTIVATION SEQUENCES OF DEVICES

BACKGROUND

Wireless interactive client devices, such as smartphones, audio/video devices, or internet-of-things devices, can be activated in sequences for various purposes, such as for entertainment, security, or education purposes. In one approach, the sequences assume that client devices are stationary, and information regarding their locations is manually programmed. In this approach, as mobile client devices change locations, the sequences may become unsuitable for their purposes, and require reprogramming.

In another approach, wireless positioning techniques are used to track the locations of interactive client devices. Some of those current wireless positioning techniques rely on satellites and/or base stations, which are commercially limited in accuracy to approximately a couple meters and susceptible to interference caused by material obstructions, such as walls, windows, and concrete floors, which can further limit the accuracy. Other current wireless positioning techniques rely on multiple indoor access points and/or tracking systems, which are expensive and inherently complex to setup, operate, and maintain, requiring specially trained engineers and/or technicians for service. And even other current wireless positioning techniques rely on received signal strength indication (RSSI), which has high error rates for indoor client devices. Moreover, indoor wireless positioning techniques relying on cameras, or other sensors that reveal information beyond just the location of a client device, are unsuitable for private areas, such as hotel rooms or classified facilities.

Consequently, there is a need in the art for dynamically sequencing activation of mobile client devices indoors in a simpler, more accurate, cheaper, and non-intrusive manner.

SUMMARY

There are provided systems and methods for determining activation sequences of devices, substantially as shown in and/or described in connection with at least one of the figures, and as set forth more completely in the claims.

DETAILED DESCRIPTION

Figure 1:
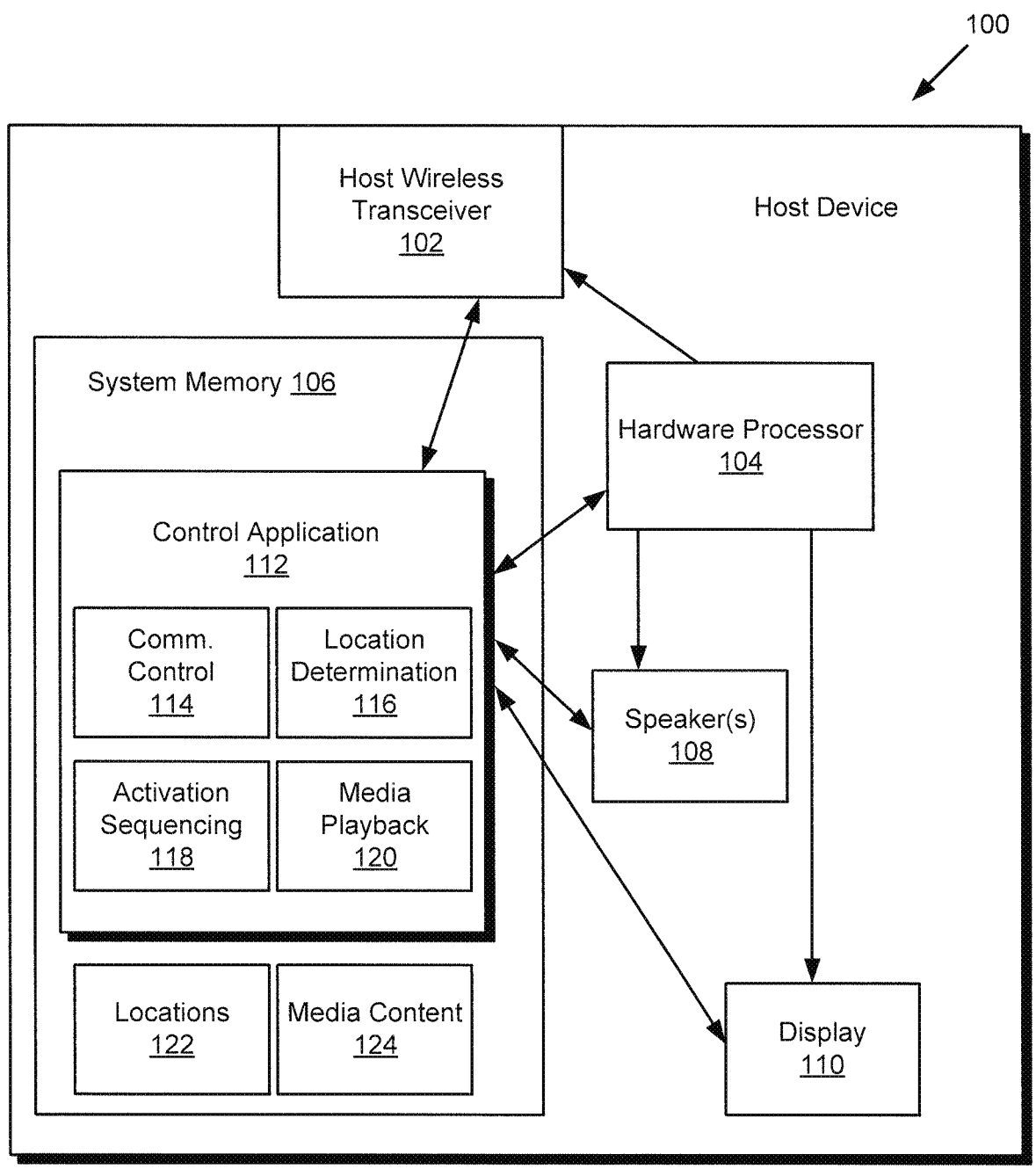
FIG. 1 shows a diagram of an exemplary host device suitable for use as part of a system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary host device suitable for use as part of a system, according to one implementation. As shown in FIG. 1, exemplary host device 100 includes hardware processor 104 and system memory 106 implemented as a non-transitory storage device storing control application 112. In addition, host device 100 includes host wireless transceiver 102, one or more speaker(s) 108, and display 110. Also shown in FIG. 1 are communications control 114, location determination 116, activation sequencing 118, and media playback 120 of control application 112, as well as locations 122 and media content 124.

Hardware processor 104 may be the central processing unit (CPU) for host device 100, for example, in which role hardware processor 104 runs the operating system for host device 100 and executes control application 112. System memory 106 may take the form of any computer-readable non-transitory storage medium. The expression "computer-readable non-transitory storage medium," as used in the present application, refers to any medium, excluding a carrier wave or other transitory signal that provides instructions to a hardware processor of a computing platform, such as hardware processor 104 of host device 100. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, RAM, programmable read-only memory (PROM), erasable PROM (EPROM), and FLASH memory.

Host wireless transceiver 102 may be implemented as a wireless communication unit enabling host device 100 to exchange data with client devices (not shown in FIG. 1), via wireless signals. For example, host wireless transceiver 102 may be configured to support one or more of WiFi, Bluetooth, Bluetooth Low Energy (BLE), ZigBee, Z-Wave, and 60 GHz wireless communications protocols. Moreover, in some implementations, host wireless transceiver 102 may also be configured for cellular communications via a 4G wireless network, and/or via a 5G wireless network satisfying the IMT-2020 requirements established by the International Telecommunication Union (ITU). It is noted that display 110 may be implemented as a liquid crystal display (LCD), a light-emitting diode (LED) display, an organic light-emitting diode (OLED) display, or any other suitable display screen that performs a physical transformation of signals to light. Speaker(s) 108 may be implemented as a micro-electrical mechanical systems (MEMS) speaker, a speaker array, or any other suitable speaker that performs a physical transformation of signals to sound.

Figure 2:
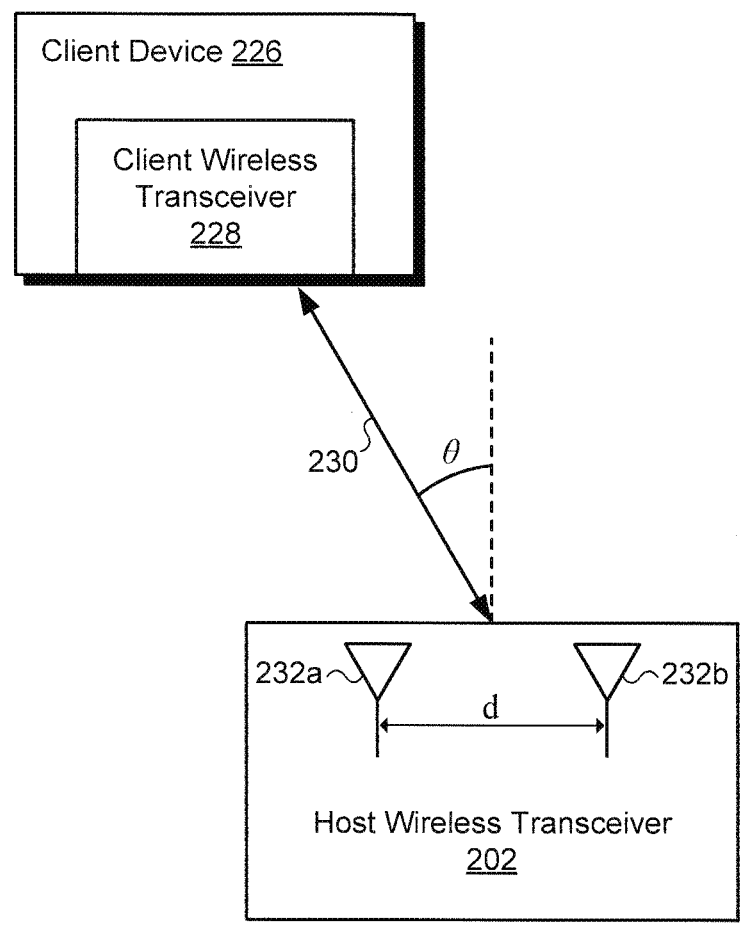
FIG. 2 shows a diagram of an angle of arrival of a wireless signal transmitted by a client device suitable for use as part of a system, according to one implementation.
Figure 2:
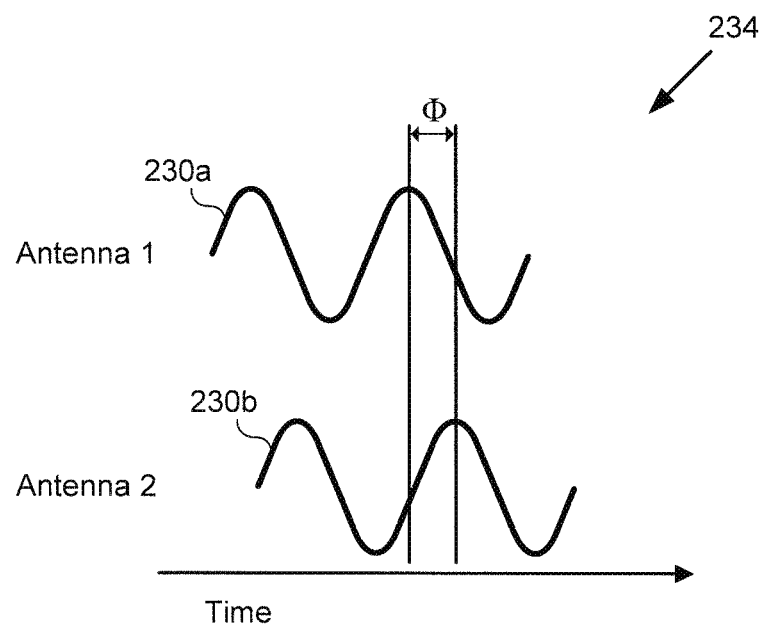

FIG. 2 shows a diagram of an angle of arrival of a wireless signal transmitted by a client device suitable for use as part of a system, according to one implementation. As shown in FIG. 2, client device 226 includes client wireless transceiver 228 in wireless communication with host wireless transceiver 202. As described below, client device 226 is capable of activation and can include other components not shown in FIG. 2. For example, client device 226 can be a smartphone, animatronic device, lighting device, locomotive device, speaker, display, toy, or other viable consumer/enterprise device, or a combination thereof. Host wireless transceiver 202 includes antennas 232a and 232b separated by distance "d". Host wireless transceiver 202 is in wireless communication with client wireless transceiver 228 using antennas 232a and 232b. Host wireless transceiver 202 in FIG. 2 generally corresponds to host wireless transceiver 102 in FIG. 1, and may have any implementations and advantages described above.

Host wireless transceiver 202 receives wireless signal 230 transmitted by client wireless transceiver 228. Angle of arrival θ represents an angle of wireless signal 230 relative to host wireless transceiver 202. Wireless signal 230 can be a radio frequency (RF) signal. For example, wireless signal 230 can be an RF signal transmitted by client wireless transceiver 228 as part of an initial pairing with, or as part of ongoing communications with, host wireless transceiver 202. As another example, wireless signal 230 can be an RF signal transmitted by client wireless transceiver 228 during a communication interval dedicated to determining angle of arrival θ. In one implementation, client wireless transceiver 228 intermittently transmits wireless signal 230.

It is noted that wireless communications between host wireless transceiver 202 and client wireless transceiver 228 are bi-directional, and that host wireless transceiver 202 can also transmit wireless signals. In one implementation, client wireless transceiver 228 can transmit wireless signal 230 in response to wireless control signals transmitted by host wireless transceiver 202. Host wireless transceiver 202 can include more antennas than shown in FIG. 2. Although antennas 232a and 232b are illustrated as arranged in a single line, additional antennas may be arranged in another plane.

FIG. 2 also shows graph 234 including wireless signals 230a and 230b versus time. Wireless signal 230a represents the version of wireless signal 230 received at antenna 232a. Likewise, wireless signal 230b represents the version of wireless signal 230 received at antenna 232b. As shown in FIG. 2, wireless signals 230a and 230b are offset by phase shift Φ. Phase shift Φ is due to differences in the transmission path of wireless signal 230 caused by distance d between antennas 232a and 232b receiving wireless signal 230. When distance d is significantly less than a distance between client wireless transceiver 228 and host wireless transceiver 202, angle of arrival θ is given by Equation (1):

$$\theta = \sin^{-1}(\lambda \Phi / 2\pi d)$$  Equation (1).

θ represents the angle of arrival of wireless signal 230, λ represents the wavelength of wireless signal 230, Φ represents the phase shift of wireless signal 230 seen by antennas 232a and 232b, and d represents the distance between antennas 232a and 232b. Host wireless transceiver 202 includes signal processing circuitry for detecting wavelength λ and phase shift Φ of wireless signal 230. Distance d is a fixed dimension of host wireless transceiver 202. Host wireless transceiver 202 can also include other signal processing circuitry, such as beam-steering circuitry, analog/digital converters, and a modem.

Figure 3:
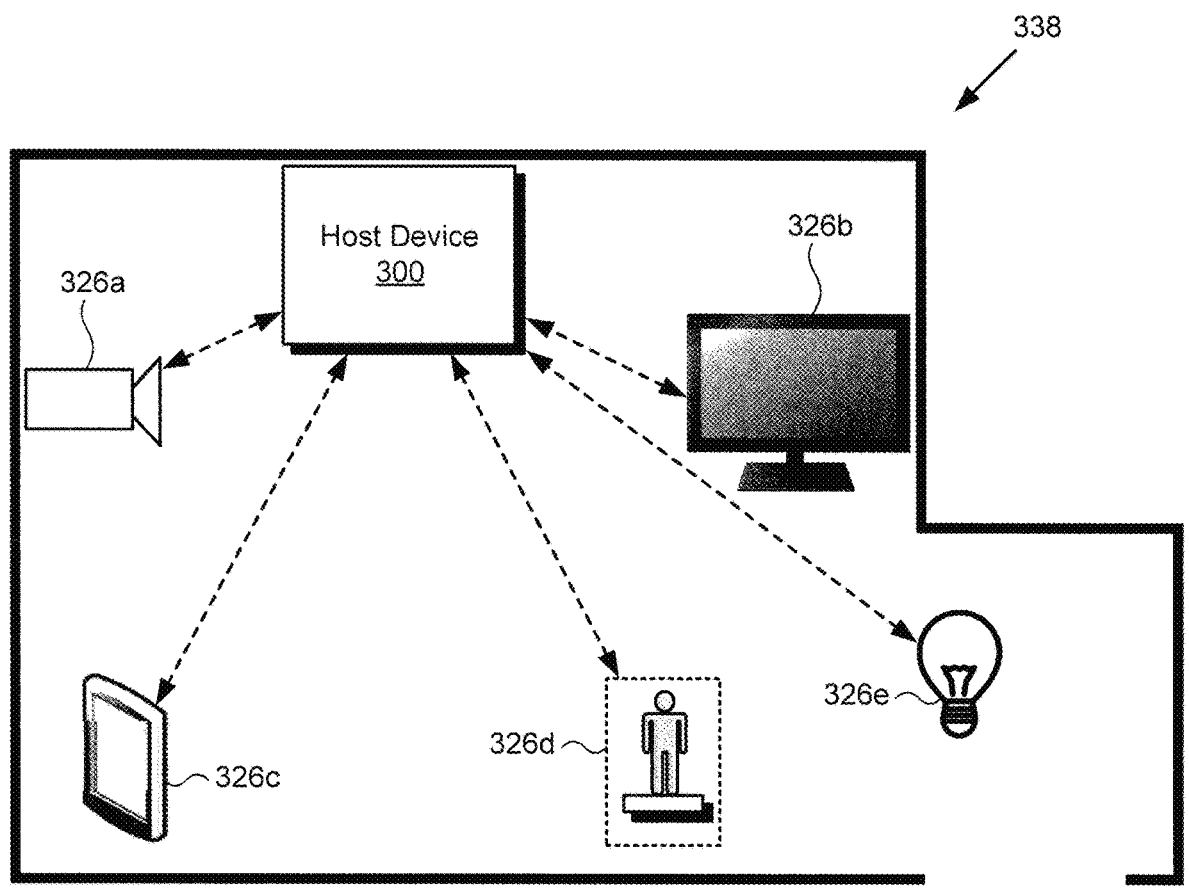
FIG. 3 shows a diagram of system including a host device in wireless communication with client devices, according to one implementation.

FIG. 3 shows a diagram of system 338 including a host device 300 in wireless communication with client devices 326a, 326b, 326c, 326d, and 326e, collectively referred to as client devices 326, according to one implementation. As shown in FIG. 3, client devices 326 are in wireless communication with host device 300. System 338 is implemented in a room, such as a hotel room or living room. Host device 300 in FIG. 3 generally corresponds to host device 100 in FIG. 1, and may have any implementations and advantages described above. Client devices 326 in FIG. 3 generally corresponds to client device 226 in FIG. 2, and may have any implementations and advantages described above.

Wireless communications between client devices 326 and host device 300 may be implemented using any one of several wireless communication protocols. In some implementations, it may be advantageous or desirable for client devices 326 to be in wireless communication with host device 300 via a Bluetooth Low Energy (BLE) protocol. Alternatively, in some implementations, client devices 326 can be in wireless communication with host device 300 using a WiFi, Bluetooth, ZigBee, Z-Wave, or 60 GHz wireless communications protocol.

As described in greater detail below, host device 300 is configured to receive wireless signals from client devices 326, and further configured to determine an activation sequence for activating client devices 326. For example, according to the exemplary implementation shown in FIG. 3, host device 300 may determine an activation sequence for activating all five client devices 326. In addition, host device 300 may transmit control signals to client devices 326, according to the activation sequence, to activate client devices 326. Host device 300 can utilize hardware processor 104 and communications control 114 of control application 112 in FIG. 1 to generate control signals. Host device 300 can utilize host wireless transceiver 102 to transmit control signals to client devices 326.

In response to receiving the control signals, client devices 326 may then activate elements according to the activation sequence using one or more of several elements with which client devices 326 may be equipped. In the present implementation, client device 326a is shown as a speaker. Client device 326a may activate a diaphragm of the speaker to play a sound or combination of sounds. In the present implementation, client device 326b is shown as a display. Client device 326b may activate pixels of the display to display an image or combination of images. In the present implementation, client device 326c is shown as a personal communication device in the form of a smartphone or tablet. Client device 326c may activate a diaphragm, display screen, or haptic motor of the smartphone to play a sound, display an image, vibrate, or combinations thereof. Client device 326c may activate an ultrasound emitter, infrared emitter, or near-field communication (NFC) or radio frequency identification (RFID) tag of the smartphone. In the present implementation, client device 326d is shown as an animatronic device. Client device 326d may activate an actuator of the animatronic device to move an articulable joint. In the present implementation, client device 326e is shown as a lighting device. Client device 326e may activate a switch or an illumination source of the lighting device to flash off and on, or to vary the color and/or intensity of radiated light.

It is noted that although FIG. 3 depicts system 338 as including five client devices 326, in other implementations, system 338 may include as few as one or two client devices 326, or more, or many more than five client devices 326. For example, although not shown in FIG. 3, system 338 can also include a locomotive device, such as a miniature train or a cleaning robot. It is noted that although client devices 326 are shown as particular devices, such as a smartphone or animatronic device, that representation is provided merely as an example. More generally, client devices 326 may be any viable mobile or stationary device capable of performing data processing sufficient to support wireless communication with host device 300, perform activation, and implement the functionality ascribed to client devices 326 herein. For example, in other implementations, client devices 326 may take the form of a toy, a camera, a microphone, a smartwatch, a gaming console, a laptop or desktop computer, a printer, or any internet-of-things device. It is also noted that system 338 can be implemented outdoors, or throughout several rooms.

Figure 4A:
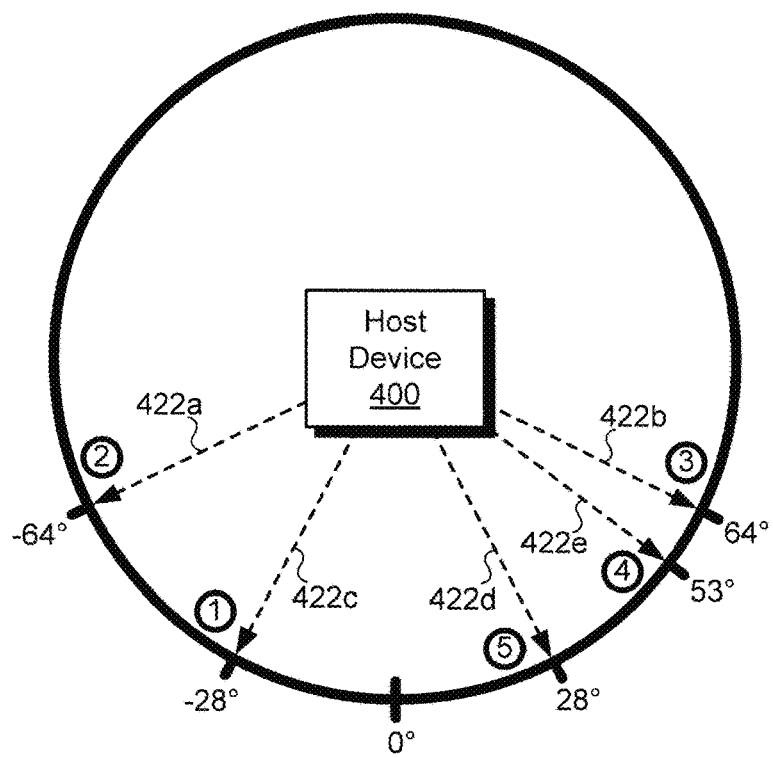
FIG. 4A shows a diagram of exemplary locations and a corresponding activation sequence suitable for use as part of the system of FIG. 3, according to one implementation.

FIG. 4A shows a diagram of exemplary locations 422a, 422b, 422c, 422d, and 422e, collectively referred to as locations 422, and a corresponding activation sequence suitable for use as part of system 338 of FIG. 3, according to one implementation. Locations 422 in FIG. 4A represent the locations of client devices 326 in FIG. 3. For example, location 422a represents the location of client device 326a. Host device 400 determines locations 422 relative to host device 400. For example, host device 400 may establish the center of an antenna array in host wireless transceiver 202 as an origin point, and the direction normal to the antenna array as 0°. Host device 400 in FIG. 4A generally corresponds to host device 100/300 in FIGS. 1 and 3, and may have any implementations and advantages described above.

Host device 400 determines locations 422 relative to host device 400 based on angles of arrival of wireless signals transmitted by client wireless transceivers. For example, host device 400 can utilize hardware processor 104 and location determination 116 of control application 112 in FIG. 1 to receive information regarding phase shift Φ and wavelength λ from host wireless transceiver 202, and to estimate the angle of arrival θ of a wireless signal 230 transmitted by a client device 226 according to Equation 1 above. In various implementations, host device 400 can also use beamforming, subspace, or maximum likelihood techniques to determine angle of arrival θ. Host device 400 then determines the location of the client device 226 relative to host device 400 based on angle of arrival θ. In the present implementation, host device 400 determines locations 422a, 422b, 422c, 422d, and 422e to be −64°, 64°, −28°, 28°, and 53°, respectively, relative to host device 400. In one implementation, host device 400 concurrently determines locations 422a, 422b, 422c, 422d, and 422e. In another implementation, in order to reduce computational complexity, host device 400 instructs client devices 326 to transmit wireless signals for determining location at separate times, such as during dedicated communication intervals.

Host device 400 can store locations 422 corresponding to locations 122, in FIG. 1, in system memory 106. Host device 400 can utilize hardware processor 104 and location determination 116 of control application 112 in FIG. 1 to further determine new locations based on stored locations 122. For example, host device 400 can attribute a weight or estimate a likelihood that a client device would be at a new location based on the difference between the new location and its previous stored location 122, thereby increasing the accuracy of host device 400. In general, the accuracy of host device 400 also increases when more antennas 232 are used in host wireless transceiver 202.

Host device 400 can utilize hardware processor 104 and activation sequencing 118 of control application 112 in FIG. 1 to determine an activation sequence for activating client devices 326 based on their locations 422 relative to host device 400. The activation sequence is illustrated in FIG. 4A by circles numbered 1 through 5. In the present implementation, the activation sequence is clockwise from 0°. Thus, client device 326c having location 422c is first in the activation sequence. Client device 326a having location 422a is second in the activation sequence. Client device 326b having location 422b is third in the activation sequence. Client device 326e having location 422e is fourth in the activation sequence. Client device 326d having location 422d is fifth in the activation sequence.

Host device 400 can then use host wireless transceiver 202 to transmit respective control signals according to the activation sequence to activate respective client devices 326. As described above, activating a client device can take many forms, including, but not limited to, playing sounds, displaying images, and moving articulable joints. In the present implementation, the clockwise activation sequence gives an experience designer the ability to create the impression of a virtual object moving around the room in a sequential and circular device-to-device manner. Notably, because the activation sequence is based on locations 422 of client devices 326 relative to host device 400, the activation sequence can change if locations 422 of client devices 326 change. For example, referring to FIG. 3, if a user of system 338 switches the locations of client devices 326c and 326d, client device 326c would be last in the activation sequence, rather than first. Similarly, the activation sequence can change if the location or orientation of host device 400 changes. Therefore, in some implementations, an activation sequence is determined before an experience starts and is actively updated periodically throughout the experience.

Host device 400 can determine a variety of activation sequences based on locations 422 relative to host device 400. For example, the activation sequence can be counter-clockwise from 0°. As another example, the activation sequence can be outward from 0° alternating between clockwise and anti-clockwise directions. That is, client device 326d having location 422d can be first in the activation sequence, client device 326c having location 422c can be second in the activation sequence, client device 326e having location 422e can be third in the activation sequence, client device 326a having location 422a can be fourth in the activation sequence, and client device 326b having location 422b can be fifth in the activation sequence. In this example, the alternating direction activation sequence could give the impression of a virtual object bouncing around a room.

In the above examples, host device 400 determines activation sequences such that one of client devices 326 are activated at a time. In other implementations, an activation sequence can concurrently activate multiple client devices 326. For example, the activation sequence can be outward from 0° in both the clockwise and anti-clockwise directions concurrently. That is, client devices 326c and 326d having locations 422c and 422d can be substantially concurrently first in the activation sequence, client device 326e having location 422e can be second in the activation sequence, and client devices 326a and 326b having locations 422b and 422b can be substantially concurrently third in the activation sequence. In this example, the concurrent outward activation sequence could give the impression of multiple virtual objects rushing toward host device 400. As another example, the activation sequence can be inward toward 0° from both the clockwise and anti-clockwise directions concurrently. As yet another example, the activation sequence can alternate halves. That is, client devices 326a and 326c having locations 422a and 422c can be substantially concurrently first in the activation sequence, and client devices 326b, 326d, and 326e having locations 422b, 422d, and 422e can be substantially concurrently second in the activation sequence. In this example, the alternating halves activation sequence could give the impression of a virtual object moving from one side of host device 400 to another. As another example, the activation sequence can alternate quadrants.

In the above examples, host device 400 determines activation sequences such that client devices 326 are activated once. In other implementations, an activation sequence can activate a client device more than once. For example, the activation sequence can be clockwise from client device 326c. That is, client device 326d having location 422d can be both first and last in the activation sequence.

In the above examples, host device 400 determines activation sequences such that all five client devices 326a, 326b, 326c, 326d, and 326e are activated. In other implementations, an activation sequence can activate more or fewer client devices 326. In various implementations, host device 400 can determine an activation sequence based on types, capabilities, or priorities of client devices 326, in addition to locations 422. For example, host device 400 may determine an activation sequence that activates client devices 326 with audio capabilities in a clockwise direction. As another example, host device 400 may determine device priorities for client devices 326 based on received wireless signals, and activate client devices 326 having a highest priority in a clockwise direction.

In various implementations, host device 400 can determine an activation sequence based on the number of client devices 326 in wireless communication with host device 400, in addition to locations 422. For example, if four or more client devices 326 are in wireless communication with host device 400, the activation sequence can alternate quadrants; if three or fewer client devices 326 are in wireless communication with host device 400, the activation sequence can alternate halves.

In various implementations, host device 400 can further determine an activation sequence based on input from a user, in addition to locations 422. For example, display 110 in FIG. 1 can be a touchscreen configured to display multiple possible activation sequences to a user, and receive input from a user selecting one of the activation sequences. As another example, speaker(s) 108 can include a microphone receiving audio input from a user, and host device 400 can further determine an activation sequence based on speech recognition. In one implementation, host device 400 continuously updates an activation sequence by regularly determining locations of client devices 326. In various implementations, host device 400 determines a new activation sequence when one of locations 422 changes by more than a threshold amount, when one of client devices 326 crosses another one of client devices 326, or when one of client device 326 enters/breaks wireless communication.

In various implementations, host device 400 uses host wireless transceiver 202 to transmit control signals according to an activation sequence in response to user input, or automatically in response to a trigger event, such as a user entering/leaving a room, host device 400 detecting a keyword, or one of client devices 326 launching an experience within an application. When determining an activation sequence, host device 400 may also determine a duration of each activation in the activation sequence. Control signals transmitted by host device 400 using host wireless transceiver 202 can include this duration information.

In the above examples, host device 400 uses hardware processor 104 and control application 112 in FIG. 1 to determine locations 422 and an activation sequence. In other implementations, control application 112 may be implemented utilizing a distributed or cloud-based system, such that some calculations are performed remotely from host device 400. In one implementation, multiple host devices can be used. For example, a first portion of an activation sequence can be based on locations 422 relative to host device 400, while a second portion of the activation sequence can be based on locations relative to a second host device. As another example, an activation sequence can be based on locations 422 relative to host device 400, while a second host device helps determine locations 422 with greater accuracy.

Host device 400 can determine an activation sequence based on a media content being played, in addition to locations 422. For example, host device 400 is integrated with a playback device, and can utilize hardware processor 104 and media playback 120 of control application 112 in FIG. 1 to play media content 124 stored in system memory 106 using display 110 and/or speaker(s) 108. Media content 124 can be, for example, a movie or a song. Media content 124 can include metadata cues which activation sequencing 118 of control application 112 in FIG. 1 can use in combination with locations 422 to determine an activation sequence. Host device 400 can then use host wireless transceiver 202 to transmit respective control signals according to the activation sequence and in synchronization with media content 124 being played, to activate respective client devices 326. The activation sequence and/or the transmission of control signals may be synchronized to audio, video, timestamps, or metadata cues of media content 124.

Host device 400 can determine a variety of activation sequences based on media content 124 and locations 422 relative to host device. In one implementation, media content 124 is a movie, a character in the movie exits the screen to the left in one scene, and enters the screen on the right in another scene. Based on this, host device 400 determines that the activation sequence is clockwise from 0°. Host device 400 then uses locations 422 to determine that client device 326c having location 422c is first in the activation sequence, client device 326a having location 422a is second in the activation sequence, client device 326b having location 422b is third in the activation sequence, client device 326e having location 422e is fourth in the activation sequence, and client device 326d having location 422d is fifth in the activation sequence. The activation sequence is illustrated in FIG. 4A by circles numbered 1 through 5. The end result of activating client devices 326 according to the activation sequence and in synchronization with the media content 124 being played is that host device 400 creates the impression that the movie character circled the room, passing through client devices 326, before returning to the screen.

In one implementation, a movie character in media content 124 exits the screen, and client device 326d is an animatronic device corresponding to the movie character. Based on this, host device 400 determines an activation sequence that ends with activation of client device 326d, to give the impression that the movie character now resides in its animatronic device counterpart. In one implementation, the movie character alternates pointing left and right. Based on this, host device 400 determines an activation sequence that alternates activating half of client devices 326, to give the impression that the movie character pointing affects the real world. In one implementation, the movie character may bounce around the screen. Based on this, host device 400 determines an activation sequence that activates client devices 326 outward from 0° alternating between clockwise and anti-clockwise directions, to exaggerate how far the movie character bounced.

In one implementation, media content 124 can be a video game taking place in a virtual environment where virtual objects are mapped to locations 422 of client devices 326, and host device 400 can determine an activation sequence to give the impression that the virtual objects activate virtual elements. In various implementations, media content 124 may be an audio book, and host device 400 can determine an activation sequence based on events of the audio book or detected keywords. In one implementation, the media content being played can be a live stream, rather than stored media content 124. In one implementation, rather than using metadata cues, host device 400 can apply video recognition features, such as object tracking, to media content 124, and activation sequencing 118 can utilize the results of the video recognition in combination with locations 422 to determine an activation sequence.

Figure 4B:
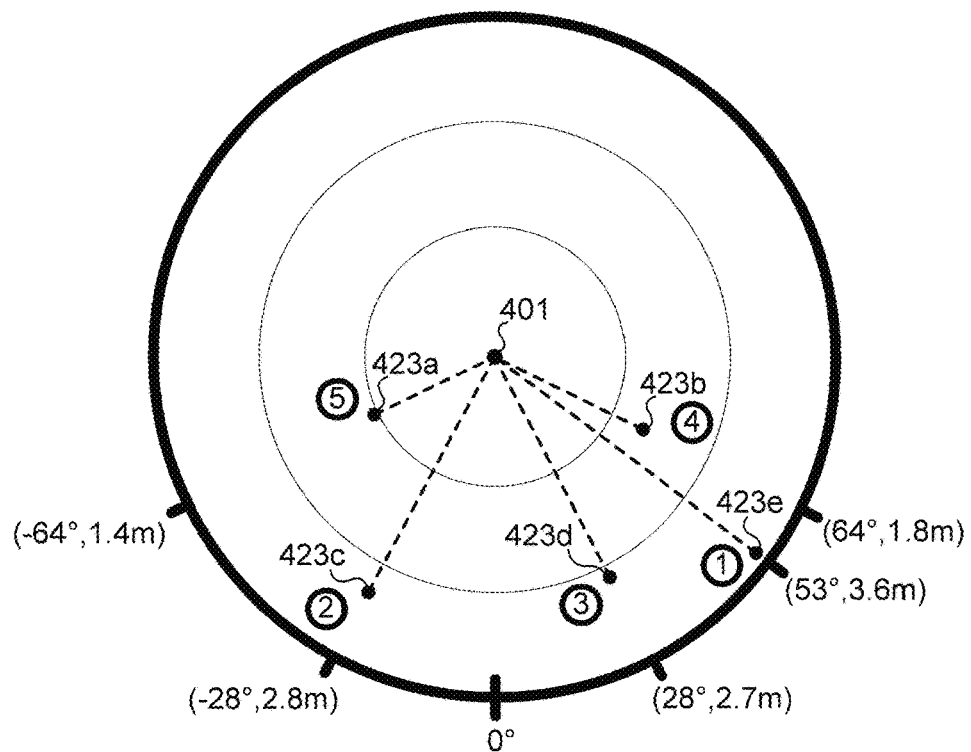
FIG. 4B shows a diagram of exemplary locations and a corresponding activation sequence suitable for use as part of the system of FIG. 3, according to one implementation.

FIG. 4B shows a diagram of exemplary locations 423a, 423b, 423c, 423d, and 423e, collectively referred to as locations 423, and a corresponding activation sequence suitable for use as part of system 338 of FIG. 3, according to one implementation. Locations 423 in FIG. 4B represent the locations of client devices 326 in FIG. 3. For example, location 423a represents the location of client device 326a. Origin point 401 represents the location of host device 400. Host device 400 determines locations 423 relative to host device 400 itself. For example, host device 400 may establish the center of an antenna array in host wireless transceiver 202 as an origin point 401, and the direction normal to the antenna array as 0°.

Host device 400 determines locations 423 relative to host device 400 based on angles of arrival of wireless signals transmitted by client wireless transceivers 228, and also based on distances between client devices 326 and host device 400. Distances between client devices 326 and host device 400 are estimated using a travel time of a wireless signal of the wireless communications between client devices 326 and host device 400. For example, host device 400 can utilize hardware processor 104 and location determination 116 of control application 112 in FIG. 1 to receive information from host wireless transceiver 202 regarding travel times, and to estimate the distances between client devices 326 and host device 400 using those travel times.

Host device 400 can use any technique known in the art for determining the travel times of the wireless signals of the wireless communications between client devices 326 and host device 400. In one implementation, host device 400 can use a one-way ranging technique to determine the travel times. Host device 400 can synchronize with a client device 326, the client device 326 can use client wireless transceiver 228 to transmit a wireless signal having a transmission timestamp, host device 400 can use host wireless transceiver 202 to receive the wireless signal and apply a reception timestamp, and host device 400 can calculate the travel time of the wireless signal as the difference between the transmission timestamp and the reception timestamp. Host device 400 then estimates the distance between the client device 326 and the host device 400 as the product of the travel time and the travel speed of the wireless signal. The travel speed can be a given value, for example, for RF wireless signals the travel speed can be approximately the speed of light in air. Host device 400 then determines the location of the client device 226 relative to host device 400 based on the estimated distance and angle of arrival θ.

In the present implementation, host device 400 determines locations 423a, 423b, 423c, 423d, and 423e to be 1.4 meters away, 1.8 meters away, 2.8 meters away, 2.7 meters away, and 3.6 meters away, respectively, from host device 400. Host device 400 also determines locations 423a, 423b, 423c, 423d, and 423e to be −64°, 64°, −28°, 28°, and 53°, respectively, relative to host device 400. Thus, unlike in FIG. 4A where locations 422 include only angular components, in FIG. 4B locations 423 include both distance and angular components.

In another implementation, host device 400 can use a two-way ranging technique to determine travel times. Host device 400 does not need to synchronize with a client device 326. Host device can use host wireless transceiver 202 to transmit a wireless signal having a transmission timestamp to a client device 326, along with instructions for the client device to transmit a response wireless signal after a fixed delay, host device 400 can use host wireless transceiver 202 to receive the response wireless signal and apply a reception timestamp, and host device 400 can calculate the travel time of the wireless signal by subtracting the fixed delay from the difference between the transmission timestamp and the reception timestamp, and halving the result to account for the fact that the wireless signal traveled round-trip.

In another implementation, host device 400 can use a hybrid ultrasonic/RF technique to determine travel times. Client device 326 and host device 400 can each be equipped with an ultrasonic transceiver. Client device 326 can use its ultrasonic transceiver and client wireless transceiver 228 to concurrently transmit an ultrasonic signal and an RF signal, host device 400 can use its ultrasonic transceiver and host wireless transceiver 202 to receive the ultrasonic signal and the RF signal and apply reception timestamps, and host device 400 can estimate the travel time of the ultrasonic signal as the difference between the reception timestamps. Host device 400 then estimates the distance between the client device 326 and the host device 400 as the product of the travel time and the travel speed of the ultrasonic signal. The travel speed can be a given value, for example, the travel speed can be approximately the speed of sound in air. Host device 400 can be equipped with environmental sensors, such as gas, pressure, and/or temperature sensors to account for environmental factors that influence the travel speed of the ultrasonic signal.

Host device 400 can also determine locations 423 of client devices 326 based on environmental information such as location and material of fixed structures like walls, windows, or plates. For example, host device 400 can be pre-programmed with knowledge of the room in system memory 106 in FIG. 1. Using this knowledge, hardware processor 104 and location determination 116 of control application 112 can estimate a likelihood that a determined location 423 corresponds to a reflection of wireless signals, rather than an actual location 423 of a client device 326, or a likelihood that the determined location 423 corresponds to a client device 326 outside a predefined area, such as in a neighboring hotel room, and exclude those locations 423 when determining an activation sequence. Host device 400 can also use any technique known in the art for improving the accuracy of the determined locations 423, such as algorithms that account for multipath, non-line-of-sight, reflection, refraction, and other phenomena.

Host device 400 can utilize hardware processor 104 and activation sequencing 118 of control application 112 in FIG.

1 to determine an activation sequence for activating client devices 326 based on the locations 423 relative to host device 400. The activation sequence is illustrated in FIG. 4B by circles numbered 1 through 5. In the present implementation, the activation sequence is furthest to closest. Thus, client device 326e having location 423e is first in the activation sequence. Client device 326c having location 423c is second in the activation sequence. Client device 326d having location 423d is third in the activation sequence. Client device 326b having location 423b is fourth in the activation sequence. Client device 326a having location 423a is fifth in the activation sequence.

Host device 400 can then use host wireless transceiver 202 to transmit respective control signals according to the activation sequence to activate respective client devices 326. As described above, activating a client device can take many forms, including, but not limited to, playing sounds, displaying images, and moving articulable joints. In the present implementation, the furthest to closest activation sequence could give the impression of a virtual object approaching host device 400. Notably, because the activation sequence is based on locations 423 of client devices 326 relative to host device 400, the activation sequence can change if locations 423 of client devices 326 change. For example, referring to FIG. 3, if a user of system 338 moves client device 326c closer to host device 300 than client device 326d, client device 326c would be third in the activation sequence, rather than second. Similarly, the activation sequence can change if the location or orientation of host device 400 changes.

Host device 400 can determine a variety of activation sequences based on locations 423 relative to host device. For example, the activation sequence can be closest to furthest. As another example, the activation sequence can concurrently activate client devices 326 in a near zone, then concurrently activate client devices 326 in a far zone. That is, host device 400 may establish a first zone for locations 423 between zero meters and one meter away, a second zone for locations 423 between one meter and two meters away, and a third zone for locations 423 greater than two meters away. Client devices 326a and 326b having locations 423a and 423b in the second zone can be substantially concurrently first in the activation sequence, and client devices 326c, 326d, and 326e having locations 423c, 423d, and 423e can be substantially concurrently second in the activation sequence. In this example, the zonal outward activation sequence could give the impression of a virtual object radiating away from host device 400.

Figure 5:
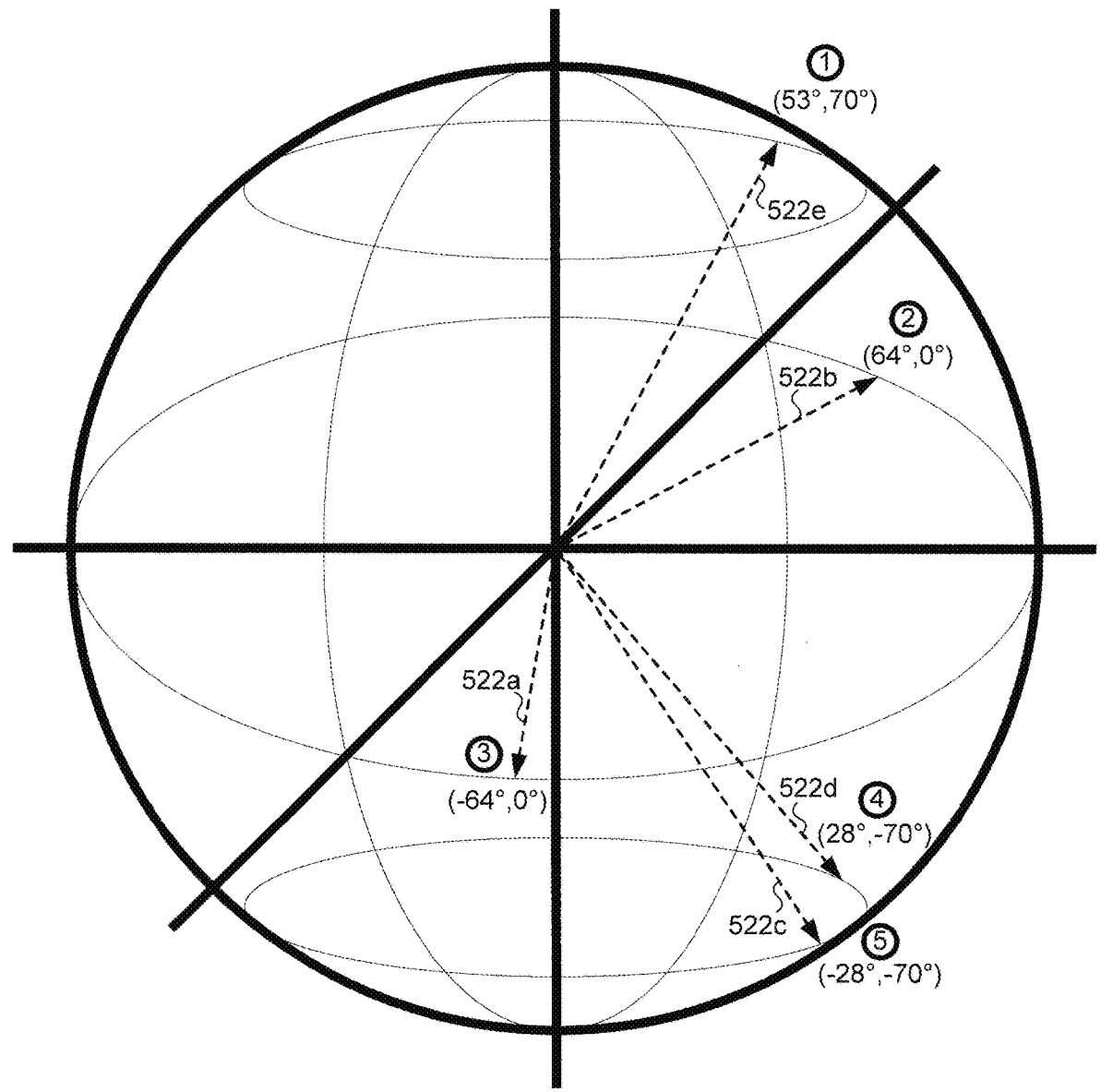
FIG. 5 shows a diagram of exemplary locations and a corresponding activation sequence suitable for use as part of the system of FIG. 3, according to one implementation.

FIG. 5 shows a diagram of exemplary locations 522a, 522b, 522c, 522d, and 522e, collectively referred to as locations 522, and a corresponding activation sequence suitable for use as part of system 338 of FIG. 3, according to one implementation. Unlike in FIG. 4A where locations 422 were two-dimensional (2D) angles including a single angular component, in FIG. 5 locations 522 are three-dimensional (3D) angles including two angular components. As described above with respect to FIG. 2, host device 400 can use antennas 232a and 232b arrayed along one dimension in host wireless transceiver 202 to determine a 2D angle of arrival θ. In an analogous fashion, in FIG. 5, host device 400 can use three or more antennas arrayed along two dimensions in host wireless transceiver 202 to determine 3D angles for locations 522.

In the present implementation, host device 400 determines locations 522a, 522b, 522c, 522d, and 522e to be given by angular coordinate pairs (−64°,0°), (64°,0°), (−28°,−70°), (28°,−70°), and (53°,70°), respectively, relative to host device 400. As described below, locations 522 can also include components for distances between client devices 326 and host device 400. In this example, client devices 326a and 326b may be located on a desk or shelf, client devices 326c and 326d may be located on a floor, and client device 326e may be located on a ceiling.

Host device 400 can utilize hardware processor 104 and activation sequencing 118 of control application 112 in FIG. 1 to determine an activation sequence for activating client devices 326 based on the locations 522 relative to host device 400. The activation sequence is illustrated in FIG. 5 by circles numbered 1 through 5. In the present implementation, the activation sequence spirals downward from (0°, 90°) and clockwise from (0°,0°). Thus, client device 326e having location 522e is first in the activation sequence. Client device 326b having location 423b is second in the activation sequence. Client device 326a having location 522a is third in the activation sequence. Client device 326d having location 522d is fourth in the activation sequence. Client device 326c having location 522c is fifth in the activation sequence.

Host device 400 can then use host wireless transceiver 202 to transmit respective control signals according to the activation sequence to activate respective client devices 326. As described above, activating a client device can take many forms, including, but not limited to, playing sounds, displaying images, and moving articulable joints. In the present implementation, the spiral activation sequence could give the impression of a virtual object spinning and landing on the floor. Notably, because the activation sequence is based on locations 522 of client devices 326 relative to host device 400, the activation sequence can change if locations 522 of client devices 326 change. For example, referring to FIG. 3, if a user of system 338 lifts client device 326c higher up than client device 326d, client device 326c would be fourth in the activation sequence, rather than fifth. Similarly, the activation sequence can change if the location or orientation of host device 400 changes.

Host device 400 can determine locations 522 relative to host device 400 based on 3D angles, and also based on distances between client devices 326 and host device 400. As described above with respect to FIG. 4B, distances between client devices 326 and host device 400 can be estimated using the travel times of the wireless signals of the wireless communications between client devices 326 and host device 400. By determining locations 522 using 3D angles and distances, precise spatial locations of client devices 326 can be determined. In one implementation, precise spatial locations of client devices 326 are mapped to virtual objects in a 3D virtual environment of a video game, and host device 400 can determine an activation sequence to give the impression that the virtual objects activate virtual elements.

With precise spatial locations of client devices 326, host device 400 can also determine an activation sequence relative to one of client devices 326. For example, in one implementation host device 400 is not integrated with a media playback device, and instead client device 326b is integrated with a media playback device. The media playback device is communicatively coupled to host device 400 through client device 326b. Host device 400 can use locations 522 relative to host device 400 to determine a new set of locations for client devices 326a, 326c, 326d, and 326e relative to the media playback device integrated with client device 326b.

Referring back to FIG. 3, in one implementation, the media playback device integrated with client device 326b plays a movie, and a character in the movie exits the screen to the left in one scene, and enters the screen on the right in another scene. Based on this, host device 300 determines that the activation sequence is clockwise from a direction normal to client device 326*b*. Host device 300 then uses precise spatial locations to determine that client device 326*d* is first in the activation sequence, client device 326*c* is second in the activation sequence, client device 326*a* is third in the activation sequence, and client device 326*e* is fourth in the activation sequence. To preserve clarity, this activation sequence clockwise from the direction normal to client device 326*b* is not illustrated in FIG. 3 by numbered circles, as was the case in FIGS. 4A, 4B, and 5. However, the end result of activating client devices 326 based on the location of the media playback device, according to the activation sequence, and in synchronization with the media content being played, is that host device 300 creates the impression that the movie character circled the room, passing through client devices 326, before returning to the media playback device.

Figure 6:
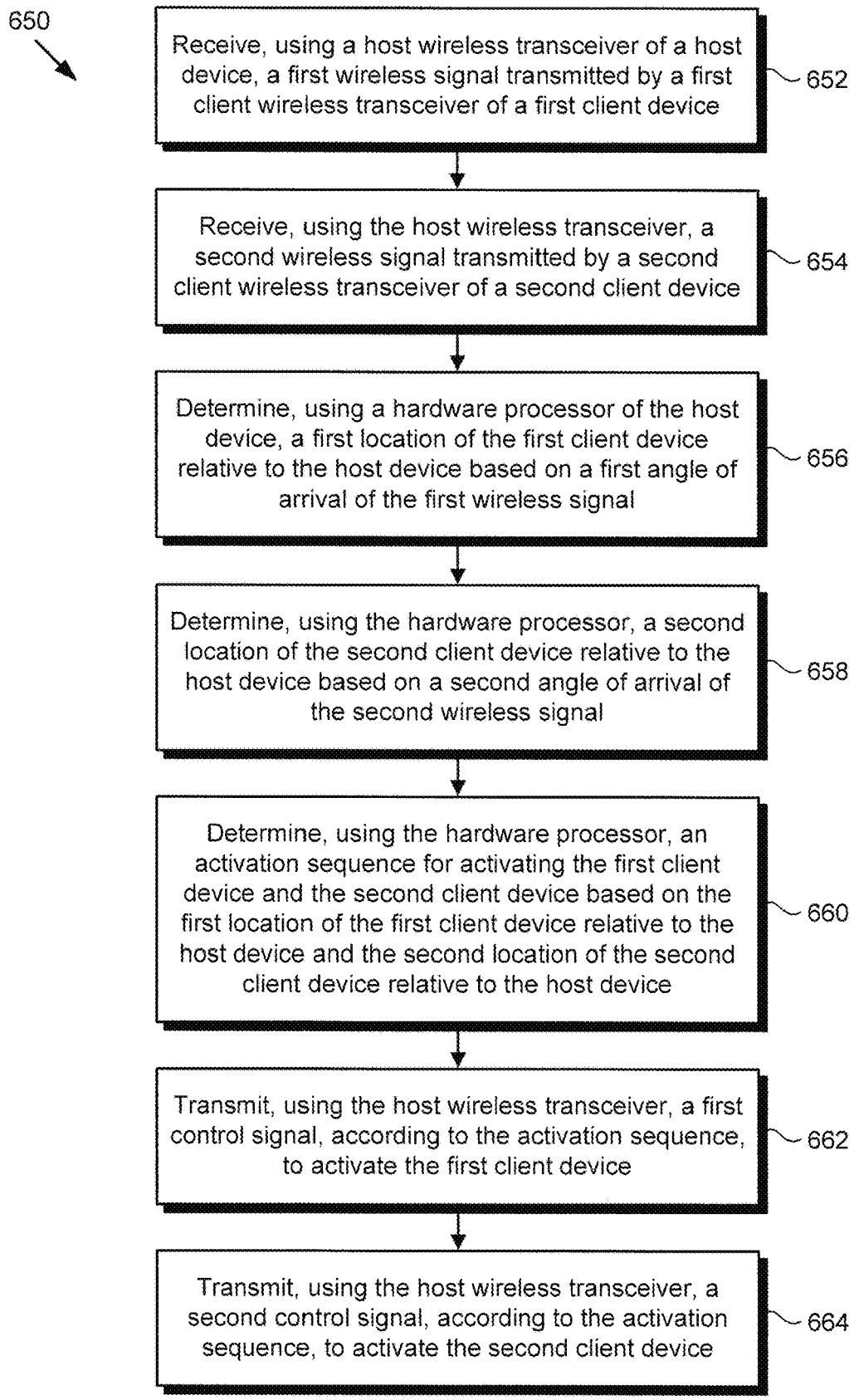
FIG. 6 is a flowchart presenting an exemplary method for use by the system of FIG. 3.

The functionality of system 338 will be further described by reference to FIG. 6 in combination with FIGS. 1, 2, 3, 4A, 4B, and 5. FIG. 6 shows flowchart 650 presenting an exemplary method for use by system 338. With respect to the method outlined in FIG. 6, it is noted that certain details and features have been left out of flowchart 650 in order not to obscure the discussion of the inventive features in the present application.

Flowchart 650 begins at action 652 with receiving, using host wireless transceiver 102/202 of host device 100/300/400, a first wireless signal 230 transmitted by a first client wireless transceiver 228 of a first client device 226/326. For example, the first client device 226/326 can be a smartphone, animatronic device, lighting device, locomotive device, speaker, display, toy, and/or other viable consumer/enterprise device. Host wireless transceiver 102/202 is in wireless communication with client wireless transceiver 228 using antennas 232*a* and 232*b*. The first client devices 226/326 can be in wireless communication with host device 100/300/400 using a BLE, WiFi, Bluetooth, ZigBee, Z-Wave, or 60 GHz wireless communications protocol.

Flowchart 650 continues at action 654 with receiving, using host wireless transceiver 102/202, a second wireless signal 230 transmitted by a second client wireless transceiver 228 of a second client device 226/326. Action 654 can be performed in a similar manner as action 652, albeit using the second client device 226/326.

Flowchart 650 continues at action 656 with determining, using hardware processor 104 of host device 100/300/400, a first location 422/423/522 of the first client device 226/326 relative to host device 100/300/400 based on a first angle of arrival θ of the first wireless signal 230. For example, host device 100/300/400 can utilize hardware processor 104 and location determination 116 of control application 112 to receive information regarding phase shift Φ and wavelength λ from host wireless transceiver 102/202, and to estimate the first angle of arrival θ of the first wireless signal 230 transmitted by the first client device 226/326 according to Equation 1 above. In various implementations, host device 100/300/400 can also use beamforming, subspace, or maximum likelihood techniques to determine the first angle of arrival θ. Host device 100/300/400 then determines the location of the first client device 226/326 relative to host device 100/300/400 based on the first angle of arrival θ.

Flowchart 650 continues at action 658 with determining, using hardware processor 104, a second location 422/423/522 of the second client device 226/326 relative to host device 100/300/400 based on a second angle of arrival θ of the second wireless signal 230. Action 658 can be performed in a similar manner as action 656, albeit using the second client device 226/326.

Flowchart 650 continues at action 660 with determining, using hardware processor 104, an activation sequence for activating the first client device 226/326 and the second client device 226/326 based on the first location 422/423/522 of the first client device 226/326 relative to the host device 100/300/400 and the second location 422/423/522 of the second client device 226/326 relative to the host device 100/300/400. For example, host device 100/300/400 can utilize hardware processor 104 and activation sequencing 118 of control application 112 to determine an activation sequence for activating client devices 226/326 based on the locations 422/423/522 relative to host device 100/300/400.

Host device 100/300/400 can determine a variety of activation sequences based on locations 422/423/522 relative to host device 100/300/400. In one implementation, the activation sequence is clockwise from 0°. The activation sequence could give the impression of a virtual object circling a room, or could provide a scanning pattern for a security system. In another implementation, host device 100/300/400 determines locations 422/423/522 based on angles of arrival θ, and also based on distances between client devices 226/326 and host device 100/300/400 estimated using the travel times of the wireless signals between client devices 226/326 and host device 100/300/400. In one implementation, the activation sequence is furthest to closest. In another implementation, the activation sequence is further based on media content 124 being played by a media playback device integrated with host device 100/300/400, in addition to locations 422/423/522. In another implementation, the activation sequence is based on the location of a media playback device integrated with a client device 226/326. The activation sequence can change if locations 422/423/522 of client devices 226/326 change.

Flowchart 650 continues at action 662 with transmitting, using the host wireless transceiver 102/202, a first control signal, according to the activation sequence, to activate the first client device 226/326. Host device 100/300/400 can utilize hardware processor 104 and communications control 114 of control application 112 to generate control signals, and can utilize host wireless transceiver 102/202 to transmit the first control signal to the first client device 226/326. In response to receiving the control signals, the first client device 226/326 then activates a first element with which the first client device 226/326 is equipped, according to the activation sequence. As described above, activating a client device can take many forms, including, but not limited to, playing sounds, displaying images, and moving articulable joints.

Flowchart 650 continues at action 664 with transmitting, using the host wireless transceiver 102/202, a second control signal, according to the activation sequence, to activate the second client device 226/326. Action 664 can be performed in a similar manner as action 662, albeit using the second client device 226/326. By activating the first and second client devices 226/326 according to the activation sequence, host device 100/300/400 can dynamically adapt system 338 to changes in locations 422/423/522. In one implementation, host wireless transceiver 102/202 further transmits the first and second control signals in synchronization with a media content, and the activation sequence creates the impression that the media content affects the real world.

Thus, the present application discloses various implementations of systems for determining activation sequences for client devices based on angle of arrival, as well as methods for use by such systems. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A host device for communications with a first client device having a first client wireless transceiver and a second client device having a second client wireless transceiver, the host device comprising:
   a host device including a hardware processor and a host wireless transceiver;
   the hardware processor of the host device configured to:
      receive, using the host wireless transceiver, a first wireless signal transmitted by the first client wireless transceiver;
      receive, using the host wireless transceiver, a second wireless signal transmitted by the second client wireless transceiver;
      determine a first location of the first client device relative to the host device based on a first angle of arrival of the first wireless signal;
      determine a second location of the second client device relative to the host device based on a second angle of arrival of the second wireless signal; and
      determine an activation sequence for activating the first client device and the second client device based on the first location of the first client device relative to the host device and the second location of the second client device relative to the host device.

2. The host device of claim 1, wherein the hardware processor of the host device is further configured to:
   transmit, using the host wireless transceiver, a first control signal, according to the activation sequence, to activate the first client device; and
   transmit, using the host wireless transceiver, a second control signal, according to the activation sequence, to activate the second client device.

3. The host device of claim 2, wherein:
   the first client device, using the first client wireless transceiver, is configured to receive the first control signal, and is configured to activate a first element of the first client device in response thereto; and
   the second client device, using the second client wireless transceiver, is configured to receive the second control signal, and is configured to activate a second element of the second client device in response thereto.

4. The host device of claim 1, further comprising a media playback device communicatively coupled to the host device and configured to play a media content, wherein the hardware processor of the host device is further configured to determine the activation sequence based on the media content being played.

5. The host device of claim 1, wherein the first client device is a smartphone, animatronic device, lighting device, locomotive device, speaker, display, or toy.

6. The host device of claim 1, wherein the first client wireless transceiver and the second client wireless transceiver operate according to Bluetooth, Bluetooth Low Energy (BLE), WiFi, ZigBee, or Z-Wave, and wherein the first angle of arrival is a two-dimensional (2D) angle or a three-dimensional (3D) angle.

7. The host device of claim 1, wherein:
   the first location of the first client device relative to the host device is further determined based on a first distance between the first client device and the host device, wherein the first distance is estimated using a first travel time of a first wireless signal communicated between the first client device and the host device; and
   the second location of the second client device relative to the host device is further determined based on a second distance between the second client device and the host device, wherein the second distance is estimated using a second travel time of a second wireless signal communicated between the second client device and the host device.

8. A system comprising:
   a host device including a hardware processor and a host wireless transceiver;
   a media playback device communicatively coupled to the host device and configured to play a media content;
   a first client device having a first client wireless transceiver;
   a second client device having a second client wireless transceiver;
   the hardware processor of the host device configured to:
      receive, using the host wireless transceiver, a first wireless signal transmitted by the first client wireless transceiver;
      receive, using the host wireless transceiver, a second wireless signal transmitted by the second client wireless transceiver;
      determine a first location of the first client device relative to the host device based on a first angle of arrival of the first wireless signal;
      determine a second location of the second client device relative to the host device based on a second angle of arrival of the second wireless signal; and
      determine an activation sequence for activating each of the first client device and the second client device based on the first location of the first client device relative to the host device, the second location of the second client device relative to the host device, and the media content being played.

9. The system of claim 8, wherein the hardware processor of the host device is further configured to:
   transmit, using the host wireless transceiver, a first control signal, according to the activation sequence and in synchronization with the media content being played, to activate the first client device; and
   transmit, using the host wireless transceiver, a second control signal, according to the activation sequence and in synchronization with the media content being played by the media playback device, to activate the second client device.

10. The system of claim 9, wherein:
   the first client device, using the first client wireless transceiver, is configured to receive the first control signal, and is configured to activate a first element of the first client device in response thereto; and
   the second client device, using the second client wireless transceiver, is configured to receive the second control signal, and is configured to activate a second element of the second client device in response thereto.

11. The system of claim 8, wherein the host device is integrated with the media playback device.

12. The system of claim 8, wherein the hardware processor of the host device is further configured to:
    determine a third location of the media playback device relative to the host device; and
    determine the activation sequence further based on the third location of the media playback device.

13. The system of claim 8, wherein the first client device is a smartphone, animatronic device, lighting device, locomotive device, speaker, display, or toy.

14. The system of claim 8, wherein the first client wireless transceiver and the second client wireless transceiver operate according to Bluetooth, Bluetooth Low Energy (BLE), WiFi, ZigBee, or Z-Wave, and wherein the first angle of arrival is a two-dimensional (2D) angle or a three-dimensional (3D) angle.

15. The system of claim 8, wherein:
    the first location of the first client device relative to the host device is further determined based on a first distance between the first client device and the host device, wherein the first distance is estimated using a first travel time of a first wireless signal communicated between the first client device and the host device; and
    the second location of the second client device relative to the host device is further determined based on a second distance between the second client device and the host device, wherein the second distance is estimated using a second travel time of a second wireless signal communicated between the second client device and the host device.

16. A method for use by a system including a host device having a hardware processor and a host wireless transceiver, a first client device having a first client wireless transceiver, and a second client device having a second client wireless transceiver, the method comprising:
    receiving, using the host wireless transceiver, a first wireless signal transmitted by the first client wireless transceiver;
    receiving, using the host wireless transceiver, a second wireless signal transmitted by the second client wireless transceiver;
    determining, using the hardware processor, a first location of the first client device relative to the host device based on a first angle of arrival of the first wireless signal;
    determining, using the hardware processor, a second location of the second client device relative to the host device based on a second angle of arrival of the second wireless signal; and
    determining, using the hardware processor, an activation sequence for activating the first client device and the second client device based on the first location of the first client device relative to the host device and the second location of the second client device relative to the host device.

17. The method of claim 16, further comprising:
    transmitting, using the host wireless transceiver, a first control signal, according to the activation sequence, to activate the first client device; and
    transmitting, using the host wireless transceiver, a second control signal, according to the activation sequence, to activate the second client device.

18. The method of claim 17, further comprising:
    receiving, by the first client device using the first client wireless transceiver, the first control signal;
    receiving, by the second client device using the second client wireless transceiver, the second control signal;
    activating a first element of the first client device in response to the first control signal; and
    activating a second element of the second client device in response to the second control signal.

19. The method of claim 16, wherein the determining the activation sequence for activating each of the first client device and the second client device is further based on a media content being played by a media playback device communicatively coupled to the host device.

20. The method of claim 16, further comprising:
    estimating, using the hardware processor, a first distance between the first client device and the host device using a first travel time of a first wireless signal communicated between the first client device and the host device;
    estimating, using the hardware processor, a second distance between the second client device and the host device using a second travel time of a second wireless signal communicated between the second client device and the host device;
    wherein the determining the first location of the first client device relative to the host device is further based on the first distance; and
    wherein the determining the second location of the second client device relative to the host device is further based on the second distance.

* * * * *